UNITED STATES PATENT OFFICE.

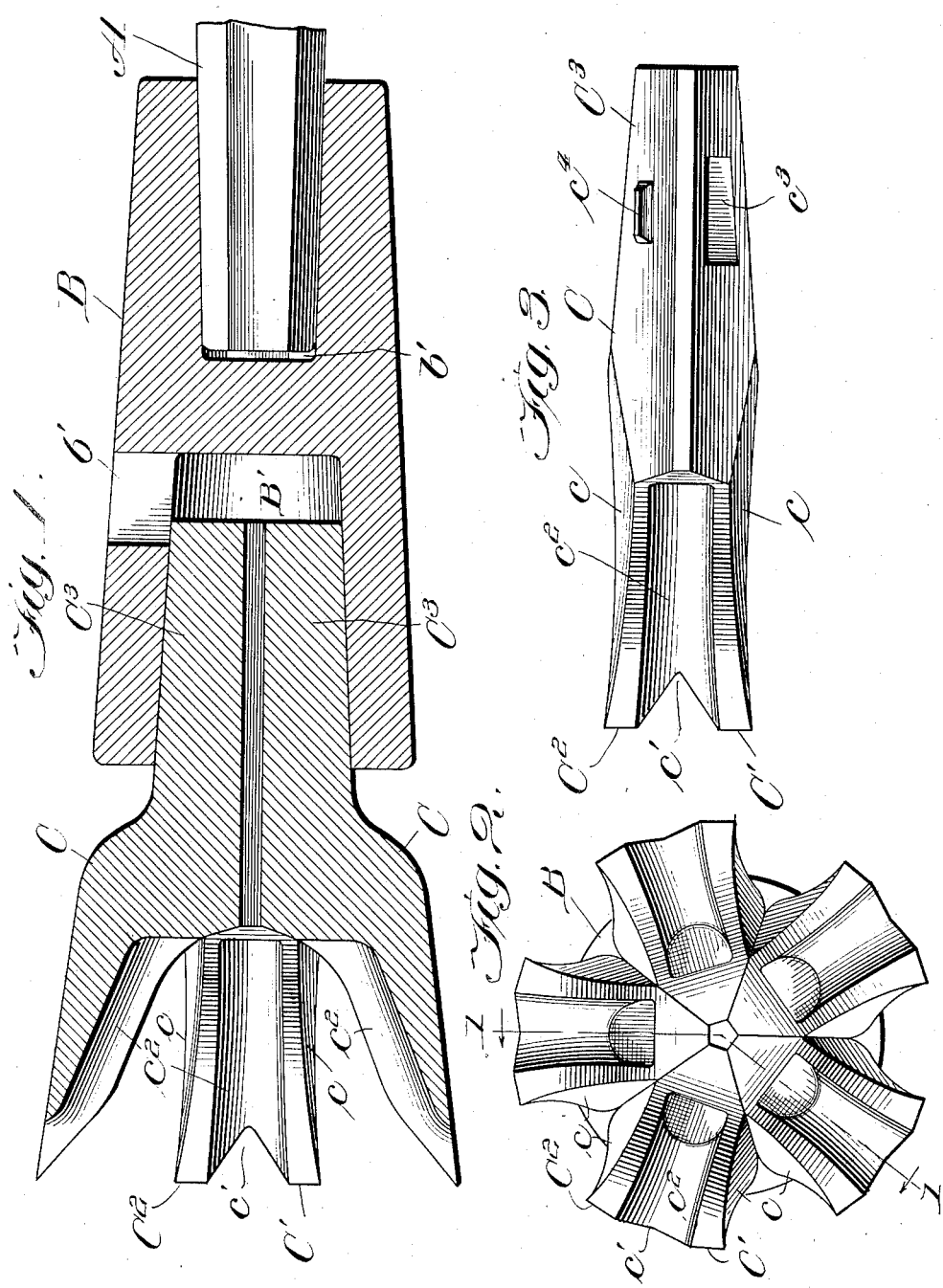

RIPLEY C. HOFFMAN, OF OSKALOOSA, IOWA.

PICK FOR MINING SHEARING-MACHINES.

No. 907,360.  Specification of Letters Patent.  Patented Dec. 22, 1908.

Application filed April 9, 1907. Serial No. 367,159.

*To all whom it may concern:*

Be it known that I, RIPLEY C. HOFFMAN, a citizen of the United States, residing at Oskaloosa, county of Mahaska, State of Iowa, have invented a certain new and useful Improvement in Picks for Mining Shearing-Machines, and declare the following to be a full, clear, and exact description of the same, such as will enable others skilled in the art to which it pertains to make and use the same, reference being had to the accompanying drawings, which form a part of this specification.

My invention relates in general to mining machinery and more particularly to an improved pick for shearing machines.

In coal mining it is customary to make vertical cuts in the solid coal to afford spaces for the displacement of the coal when blasted. It is usual to employ shearing machines in making these cuts comprising a series of picks arranged in a circle and supported in a holder at the end of an extension bar. The bar is reciprocated and rotated so that the picks chip away the coal, thereby forming a cut of a width equal to the diameter of the plane of rotation of the picks. The picks have heretofore been supported in the holders with their cutting edges extending radially with respect to the circle in which they are arranged, which results in the coal removed in making the cut being so finely divided as to be of little value. The picks as now arranged in the holders frequently become so filled with pieces of coal as to interfere with the operation of cutting.

The primary object of my invention is to provide an improved pick for mining shearing machines which will be so shaped as to cut efficiently at all times without becoming clogged with pieces of coal.

A further object of my invention is to provide a tool for mining shearing machines, the picks of which will be so arranged that the coal dislodged in making a cut will not be divided into fine particles, but will be of "pea" and "nut" sizes and therefore of greater commercial value.

The embodiment of my invention herein disclosed may be generally described as comprising a plurality of picks supported in a holder and arranged with their cutting edges in a circle, the cutting edges of the several picks being bifurcated and spaced apart so as to form passage-ways to permit the dislodged pieces of coal to fall through.

My invention will be more fully described hereinafter with reference to the accompanying drawing in which the same is illustrated as embodied in a convenient and practical form and in which—

Figure 1 is a central sectional view on line 1—1 Fig. 2; Fig. 2 an end elevation looking from the left in Fig. 1; and Fig. 3 a side elevation of one of the picks removed from the holder.

The same reference characters are used to designate the same parts in the several figures of the drawings.

Reference character A indicates the end of an extension bar of a mining shearing machine upon which is supported a pick holder B. The end of the extension bar is angular in cross-section and preferably tapered so as to fit tightly within a socket of corresponding cross-section in the end of the holder. The opposite end of the holder from the extension bar is provided with an outwardly flaring circular socket B' in which are received the shanks of the picks C.

Each of the picks C is provided with a cutting edge off-set outwardly with respect to its shank, the cutting edge being notched at $c'$ to provide two cutting portions C' and $C^2$. The inner surface of the pick is provided with a channel $c^2$ extending inwardly from the notch in the cutting edge. The sides of the pick are cut away as shown at $c$ so that when a plurality of the picks are secured within the holder channels are formed between the adjacent picks, as clearly shown in Figs. 1 and 2.

The shank $C^3$ of each pick has the cross-section of a sector so that when the proper number of picks, as for instance five, are secured to the holder the shanks $C^3$ will lie close together and be tightly wedged within the socket B' of the holder. In order to retain the shanks of the picks in proper relative positions one surface is provided with a recess $c^3$ and the other surface with a projection $c^4$, a recess in the shank of one pick receiving the projection on the shank of the adjacent pick.

In order to remove the picks an opening $b'$ is provided through the holder through which a key may be inserted to force outwardly the shank of one of the picks after which the other picks may be easily removed.

From the foregoing description it will be observed that by my improved mining tool the coal or other material dislodged in making a cut by a shearing machine will not be finely divided owing to the space within the circle formed by the cutting edges of the picks. It will also be observed that the pieces of dislodged coal will not become wedged between the picks as the passageways between adjacent picks permit the pieces of coal to fall.

Having now fully described my invention, what I claim as new and desire to secure by Letters Patent is:

A pick, for use in mining shearing machines comprising a shank adapted to be secured in a holder, a divided cutting edge off-set outwardly from the shank, a central channel in the inner surface extending inwardly from the cutting edge, the longitudinal outer surfaces extending from the cutting edge being cut away to form grooves between the pick and adjacent picks when a plurality of picks are assembled in the holder.

In testimony whereof, I sign this specification in the presence of two witnesses.

RIPLEY C. HOFFMAN.

Witnesses:
W. C. BURRELL,
H. W. GLEASON.